United States Patent
Gan et al.

(10) Patent No.: US 10,834,688 B1
(45) Date of Patent: Nov. 10, 2020

(54) WIRELESS CROSS-CONNECT DATACENTER

(71) Applicant: International Business Machines Corporation, Armonk, NY (US)

(72) Inventors: Seng Chai Gan, Ashburn, VA (US); Gregg Talewsky, Branchburg, NJ (US); Randy A. Rendahl, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/553,234

(22) Filed: Aug. 28, 2019

(51) Int. Cl.
| | |
|---|---|
| *H04W 72/08* | (2009.01) |
| *H04W 52/44* | (2009.01) |
| *H04W 52/26* | (2009.01) |
| *H04W 52/24* | (2009.01) |
| *H04W 52/36* | (2009.01) |
| *H04W 52/34* | (2009.01) |

(Continued)

(52) U.S. Cl.
CPC ....... *H04W 52/367* (2013.01); *H04L 47/6225* (2013.01); *H04W 24/10* (2013.01); *H04W 52/343* (2013.01); *H04W 72/0453* (2013.01)

(58) Field of Classification Search
CPC . H04W 84/12; H04W 12/12; H04W 12/1202; H04W 12/1204; H04W 48/16; H04W 48/20; H04W 88/06; H04L 63/1433
USPC ....... 455/69, 522, 422.1, 436, 450; 370/254, 370/329, 278, 338
See application file for complete search history.

(56) References Cited

U.S. PATENT DOCUMENTS

| | | |
|---|---|---|
| 8,417,861 B2 | 4/2013 | Rofougaran et al. |
| 8,897,184 B2 | 11/2014 | Pettus et al. |

(Continued)

FOREIGN PATENT DOCUMENTS

WO     2011044288 A3     4/2011

OTHER PUBLICATIONS

Gecko & Fly, "9 Tools to Optimize Wi-Fi Channel for a Lag Free Internet Experience", https://www.geckoandfly.com/11175/optimize-your-wifi-channel-fo, Aug. 11, 2018, 16 pgs.

(Continued)

*Primary Examiner* — Tan H Trinh
(74) *Attorney, Agent, or Firm* — William H. Hartwell; Maxine L. Barasch; Keohane & D'Alessandro, PLLC

(57) ABSTRACT

Disclosed embodiments provide techniques for automated setup of a wireless datacenter. A computer-based wireless management and discovery system communicates with datacenter computers (nodes) via a management service set identifier (SSID). The wireless management and discovery system establishes a list of eligible wireless channels that can be used for the datacenter by scanning wireless channels currently in use. Each wireless datacenter node is assigned an SSID that corresponds to the datacenter. A transmission test is performed to set a minimum transmit power for upstream and downstream communication between the datacenter nodes and corresponding wireless access points. Once the minimum transmission power levels are established, the datacenter node enters an operational mode using the assigned SSID. The setup is accomplished without human intervention. Once in operational mode, the datacenter node performs its intended datacenter function.

17 Claims, 9 Drawing Sheets

(51) Int. Cl.
  *H04L 12/863* (2013.01)
  *H04W 24/10* (2009.01)
  *H04W 72/04* (2009.01)

(56) References Cited

U.S. PATENT DOCUMENTS

| | | | |
|---|---|---|---|
| 8,972,601 B2 | 3/2015 | Padhye et al. | |
| 9,391,716 B2 | 7/2016 | Shin et al. | |
| 9,854,594 B2 | 12/2017 | Sanduleanu et al. | |
| 10,164,837 B2 | 12/2018 | Peng et al. | |
| 2004/0018843 A1* | 1/2004 | Cerwall | H04W 72/02 455/450 |
| 2005/0030964 A1* | 2/2005 | Tiedemann, Jr. | H04L 1/1819 370/431 |
| 2005/0059405 A1* | 3/2005 | Thomson | H04W 16/18 455/446 |
| 2005/0073980 A1* | 4/2005 | Thomson | H04W 16/18 370/338 |
| 2007/0223434 A1* | 9/2007 | Bennett | H04W 52/04 370/338 |
| 2007/0259659 A1* | 11/2007 | Bennett | H04W 52/283 455/422.1 |
| 2007/0298825 A1* | 12/2007 | Kayama | H04W 28/22 455/522 |
| 2008/0009306 A1* | 1/2008 | Suga | H04W 52/246 455/522 |
| 2008/0159184 A1* | 7/2008 | Niwano | H04W 52/346 370/278 |
| 2008/0300004 A1* | 12/2008 | Balachandran | H04W 72/0473 455/522 |
| 2012/0083272 A1* | 4/2012 | Jeon | H04W 52/244 455/436 |
| 2012/0246294 A1* | 9/2012 | Eaton | H04W 48/20 709/224 |
| 2012/0257585 A1* | 10/2012 | Sydor | H04W 72/082 370/329 |
| 2012/0278440 A1* | 11/2012 | Iyer | G06F 9/505 709/219 |
| 2012/0314705 A1* | 12/2012 | Howard | H04L 45/00 370/390 |
| 2013/0272164 A1* | 10/2013 | Leonardos | H04W 12/003 370/254 |
| 2013/0273923 A1* | 10/2013 | Li | H04W 28/0268 455/450 |
| 2014/0073288 A1* | 3/2014 | Velasco | H04W 12/06 455/411 |
| 2014/0211776 A1* | 7/2014 | Jang | H04W 48/16 370/338 |
| 2014/0253389 A1* | 9/2014 | Beauregard | G01S 11/16 342/458 |
| 2015/0282195 A1* | 10/2015 | Farhadi | H04W 52/143 370/229 |
| 2015/0341939 A1* | 11/2015 | Sharma | H04W 52/243 370/329 |
| 2016/0029292 A1* | 1/2016 | Lynn, Jr. | H04W 48/02 370/329 |
| 2016/0036772 A1* | 2/2016 | Pratapa | H04L 12/2854 709/245 |
| 2018/0242154 A1 | 8/2018 | Ballard et al. | |
| 2018/0331914 A1* | 11/2018 | Yoshida | H04W 4/80 |
| 2018/0343672 A1* | 11/2018 | Hassan | H04B 1/38 |
| 2019/0215704 A1* | 7/2019 | Thubert | H04W 16/10 |
| 2019/0320396 A1* | 10/2019 | Bagheri | H04W 52/146 |

OTHER PUBLICATIONS

Katayama, Yasunao et al., "Wireless Data Center Networking with Steered-Beam mmWave Links", IEEE WCNC 2011—Service and Application, 6 pgs.

* cited by examiner

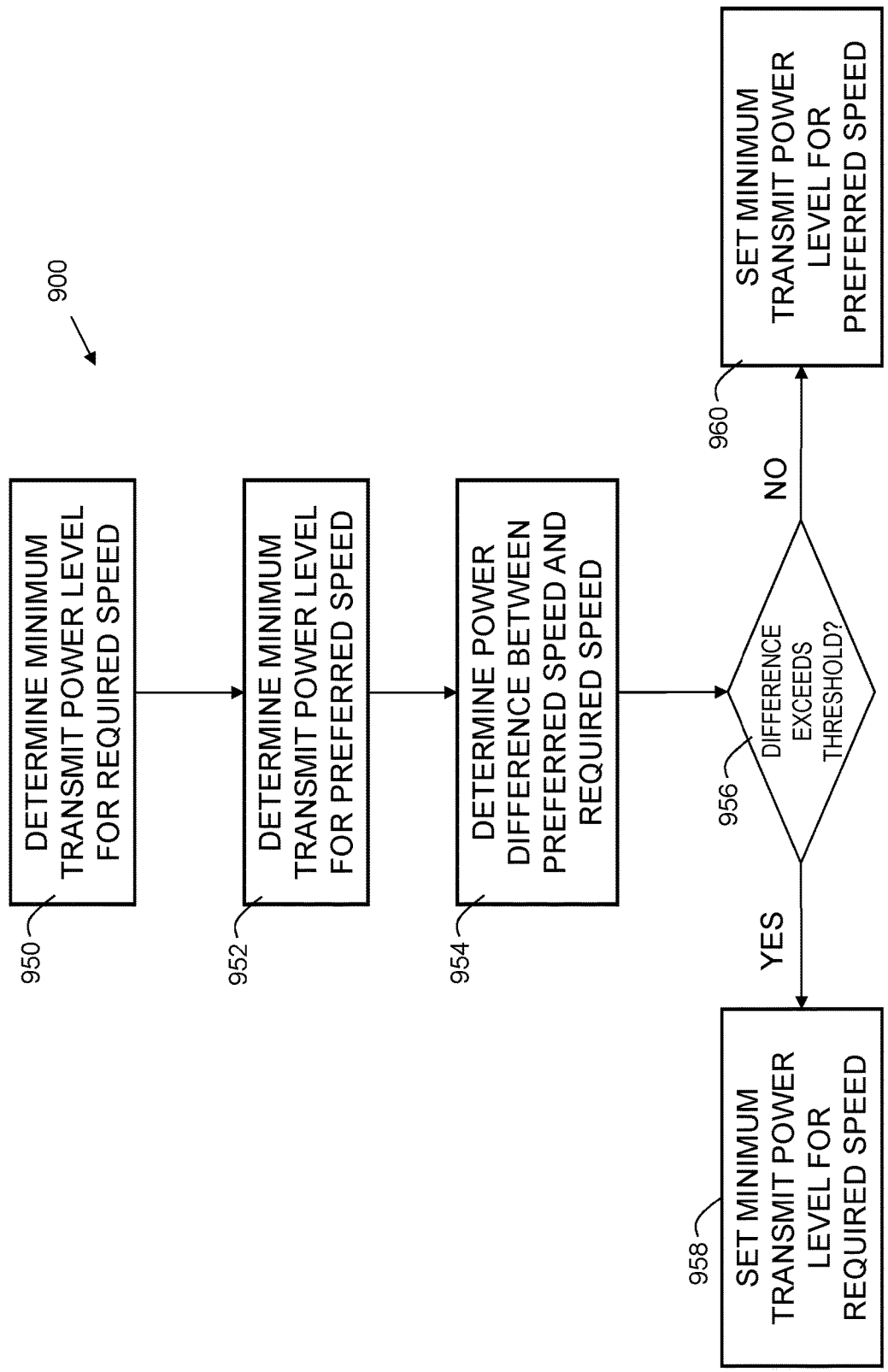

WIRELESS CROSS-CONNECT DATACENTER

FIELD

The present invention relates generally to computer datacenters and, more particularly, to a wireless cross-connect datacenter.

BACKGROUND

Datacenters are groups or clusters of networked computers used for the remote storage, processing, and/or distribution of large amounts of data. Datacenters serve many industries, academia, and government institutions. Industries such as e-commerce, cloud storage, and transportation, all rely on datacenters for daily operations. Datacenters are essential for many businesses and organizations.

SUMMARY

In one aspect, there is provided a computer-implemented method for establishing a wirelessly connected datacenter, comprising: determining a list of available radio channels; in response to a wireless datacenter node connecting to a management server via a management service set identifier (SSID): determining a minimum transmit power setting for a minimum data transmission rate for the wireless datacenter node on a radio channel selected from the list of available radio channels; assigning the wireless datacenter node an operational SSID corresponding to the radio channel; and sending the minimum transmit power setting to the wireless datacenter node.

In another aspect, there is provided an electronic computation device comprising: a processor; a memory coupled to the processor, the memory containing instructions, that when executed by the processor, cause the device to: determine a list of available radio channels; in response to a wireless datacenter node connecting to a management server via a management service set identifier (SSID): determine a minimum transmit power setting for a minimum data transmission rate for the wireless datacenter node on a radio channel selected from the list of available radio channels; assign the wireless datacenter node an operational SSID corresponding to the radio channel; and send the minimum transmit power setting to the wireless datacenter node.

In another aspect, there is provided a computer program product for an electronic computation device comprising a computer readable storage medium having program instructions embodied therewith, the program instructions executable by a processor to cause the electronic computation device to: determine a list of available radio channels; in response to a wireless datacenter node connecting to a management server via a management service set identifier (SSID): determine a minimum transmit power setting for a minimum data transmission rate for the wireless datacenter node on a radio channel selected from the list of available radio channels; assign the wireless datacenter node an operational SSID corresponding to the radio channel; and send the minimum transmit power setting to the wireless datacenter node.

BRIEF DESCRIPTION OF THE DRAWINGS

Features of the disclosed embodiments will be more readily understood from the following detailed description of the various aspects of the invention taken in conjunction with the accompanying drawings.

FIG. 9 is a flowchart indicating process steps for transmit power optimization in accordance with embodiments of the present invention.

Figure 1:
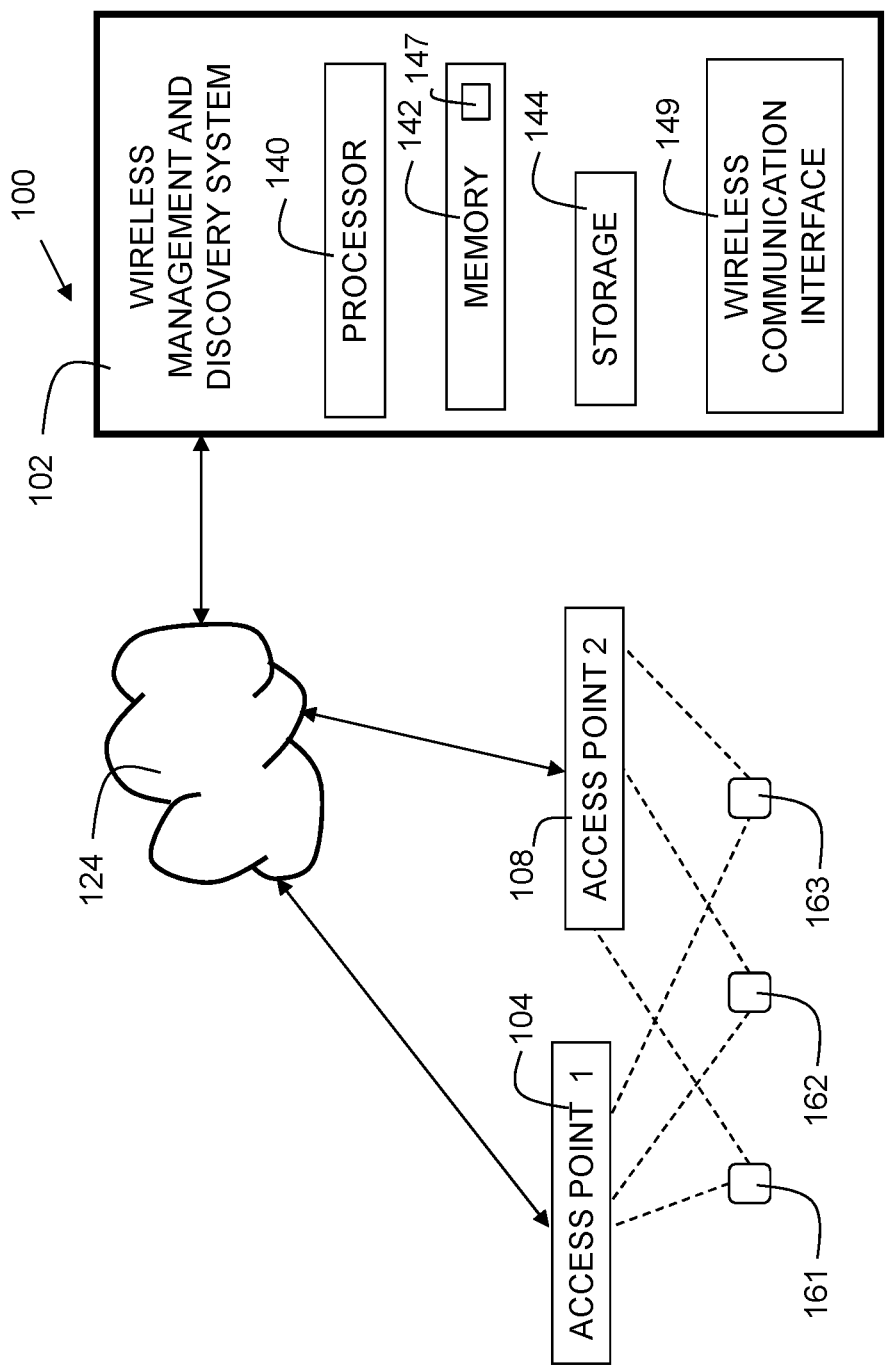
FIG. 1 is a diagram of an environment for embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Wireless communication standards such as Wi-Fi are evolving rapidly. Improvements in data throughput enable the potential of using wireless communication for datacenter connectivity. However, a significant expense within a datacenter environment is the network enablement, both the initial build-out, as well as the ongoing operational maintenance. The design and setup can be complex and requires specialized skills to build cost-effective and capable networks within large datacenters. Unfortunately, even in small datacenters, the network requires local support in terms of cabling and configuration as the server population changes. Given that human error is one of the primary causes of network downtime, it is desirable to have improvements in the setup of datacenters.

Disclosed embodiments provide techniques for automated setup of a wireless datacenter. A computer-based wireless management and discovery system communicates with datacenter computers (nodes) via a management service set identifier (SSID). The wireless management and discovery system establishes a list of eligible wireless channels that can be used for the datacenter by scanning wireless channels currently in use. Wireless channels determined to be available by a radio receiver coupled to the wireless management and discovery system are placed in a list for assignment to wireless datacenter nodes. Each wireless datacenter node is assigned an SSID that corresponds to the datacenter. A transmission test is performed to set a minimum transmit power for upstream and downstream communication between the datacenter nodes and corresponding wireless access points. Once the minimum transmission power levels are established, the datacenter node enters an operational mode using the assigned SSID. Once in operational mode, the datacenter node performs its intended datacenter function (e.g., search, cloud storage access, ecommerce, and the like).

An advantage of disclosed embodiments is that the determination of which wireless radio channels to use, and the appropriate power levels, is performed without human intervention. Furthermore, no specialized equipment such as spectrum analyzers are required. With disclosed embodiments, the minimum wireless coverage is the goal of the wireless management and discovery system. That is, the transmission power is selected to be as low as possible, while still providing connectivity between datacenter nodes and upstream access points. This allows efficient use of radio bandwidth.

Disclosed embodiments are particularly well-suited for small datacenters, ad-hoc datacenters, temporary datacenters, and/or datacenters that are established in an emergency situation (e.g. after a hurricane, earthquake, or other natural disaster), where it is desired that the datacenter be built and operational as soon as possible. In such a datacenter configuration, the datacenter nodes are preferably physically located as close as possible to one another, and also to their corresponding upstream access points. Thus, the transmission power used can be set to a relatively low level, since all participating datacenter nodes are physically located close to each other. By using a low transmission power level, it can enable setting up multiple datacenters or multiple clusters of computers within a premises (e.g. within a building, room, or other location), since radio interference between multiple datacenters is minimized by selecting the lowest (a minimal) possible transmission power.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

FIG. 1 is an environment 100 for embodiments of the present invention. Wireless management and discovery system 102 comprises a processor 140, a memory 142 coupled to the processor 140, and storage 144. System 102 is an electronic computation device. The memory 142, contains instructions 147, that when executed by the processor 140, perform embodiments of the present invention. Memory 142 may include dynamic random-access memory (DRAM), static random-access memory (SRAM), magnetic storage, and/or a read only memory such as flash, EEPROM, optical storage, or other suitable memory. In some embodiments, the memory 142 may not be a transitory signal per se. In some embodiments, storage 144 may include one or more magnetic storage devices such as hard disk drives (HDDs). Storage 144 may additionally include one or more solid state drives (SSDs). System 102 is connected to network 124, which can include the Internet, a wide area network, a local area network, or other suitable network.

In embodiments, a plurality of access points 104 and 108 are connected to the network 124. A plurality of datacenter nodes 161, 162, and 163 are connected to network 124 via a wireless cross-connect configuration, such as a fat tree.

The system 102 may optionally include a wireless communication interface 149 that can support one or more radios, allowing for configurations that support configurations without dedicated access points. In such a configuration, the datacenter nodes 161, 162, and 163 may be wirelessly connected directly to the wireless management and discovery system 102.

Figure 2:
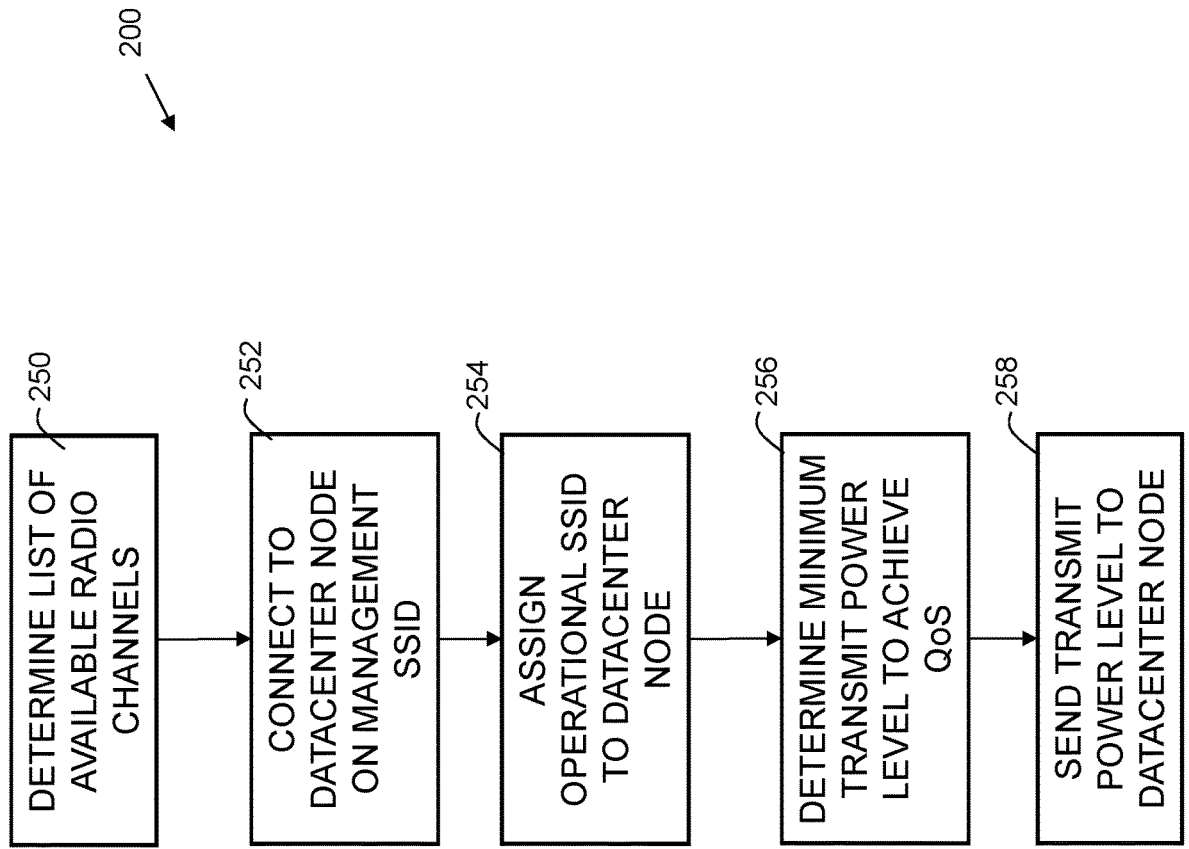
FIG. 2 is a flowchart indicating process steps for wireless management and discovery system operations.

FIG. 2 is a flowchart 200 indicating process steps for wireless management and discovery system operations. In process step 250, a list of available radio channels is determined. In embodiments, these channels can include channels in a 2.4 GHz range and/or a 5 GHz range. Other frequency ranges are possible, depending on the wireless standard in use. The determination of available radio channels can include performing a scan of all possible wireless channels in the range or ranges that are in use. In embodiments, initial configuration information is obtained as part of this process. The initial configuration information can include a wireless region (e.g., United States, Canada, etc.) which determines the available channels from which eligible channels are selected.

In process step 252, the wireless management and discovery system 102 connects to the datacenter nodes on a management SSID. The management SSID may be configured a priori in both the wireless management and discovery system 102 and each datacenter node. The management SSID serves as an agreed-upon SSID for the datacenter nodes to make first contact with the wireless management and discovery system 102 so that an operational SSID and transmission power can be established.

In process step 254, an available channel and SSID is assigned to the datacenter node. This assignment can be communicated from the wireless management and discovery system 102 to the datacenter node using the management SSID connection. Then, the datacenter node switches to the operational SSID. In embodiments, assigning the wireless datacenter node an operational SSID is performed with a round robin algorithm. As each datacenter node requests an operational SSID, the wireless management and discovery system 102 assigns the next available wireless channel and SSID to that datacenter node.

In process step 256, a minimum transmit power setting for achieving a desired quality of service (QoS), data transmission rate, or speed, is determined. The desired quality of service (QoS), data transmission rate, or speed may be included in an initial configuration for each datacenter node. The minimum transmit power setting may be identified by performing a speed test with a utility such as iperf, iperf3, or other suitable speed test. The transmit power may start at a maximum level, and a speed test is performed. The transmit power is then reduced by a predetermined amount, and the speed test is performed again. This process repeats until a transmit power is reached where the speed test falls below the desired quality of service (QoS), data transmission rate, or speed.

In process step 258, the lowest (a minimal) transmission power that achieved the desired quality of service (QoS), data transmission rate, or speed is selected and sent to the datacenter node. The transmission strength determination process may be performed in both the upstream and downstream directions. That is, the transmission strength determination process may be performed on both the datacenter node wireless transmitter and the corresponding wireless transmitter of each access point that connects to the datacenter node. Thus, the transmission power on the radio or radios within the datacenter node are adjusted to determine the optimal transmit power in the upstream direction (data being sent from the datacenter node). Similarly, the transmission power on the radio or radios within the access point (104, 108) are adjusted to determine the optimal transmit power in the downstream direction (data being sent to the datacenter node). In some applications, the upstream and downstream desired quality of service (QoS), data transmission rate, or speed may be different. Thus, embodiments may include an asymmetrical upstream and downstream configuration. This can be based on the application function of the datacenter. For example, if a datacenter is intended primarily to be used for allowing connected client devices to download data, then the upstream (from the perspective of the datacenter node) quality of service (QoS), data transmission rate, or speed may be greater than the downstream (from the perspective of the datacenter node) quality of service (QoS), data transmission rate, or speed. Conversely, if a datacenter is intended primarily to be used for allowing connected client devices to upload data, then the upstream (from the perspective of the datacenter node) quality of service (QoS), data transmission rate, or speed may be less than the downstream (from the perspective of the datacenter node) quality of service (QoS), data transmission rate, or speed.

Figure 3:
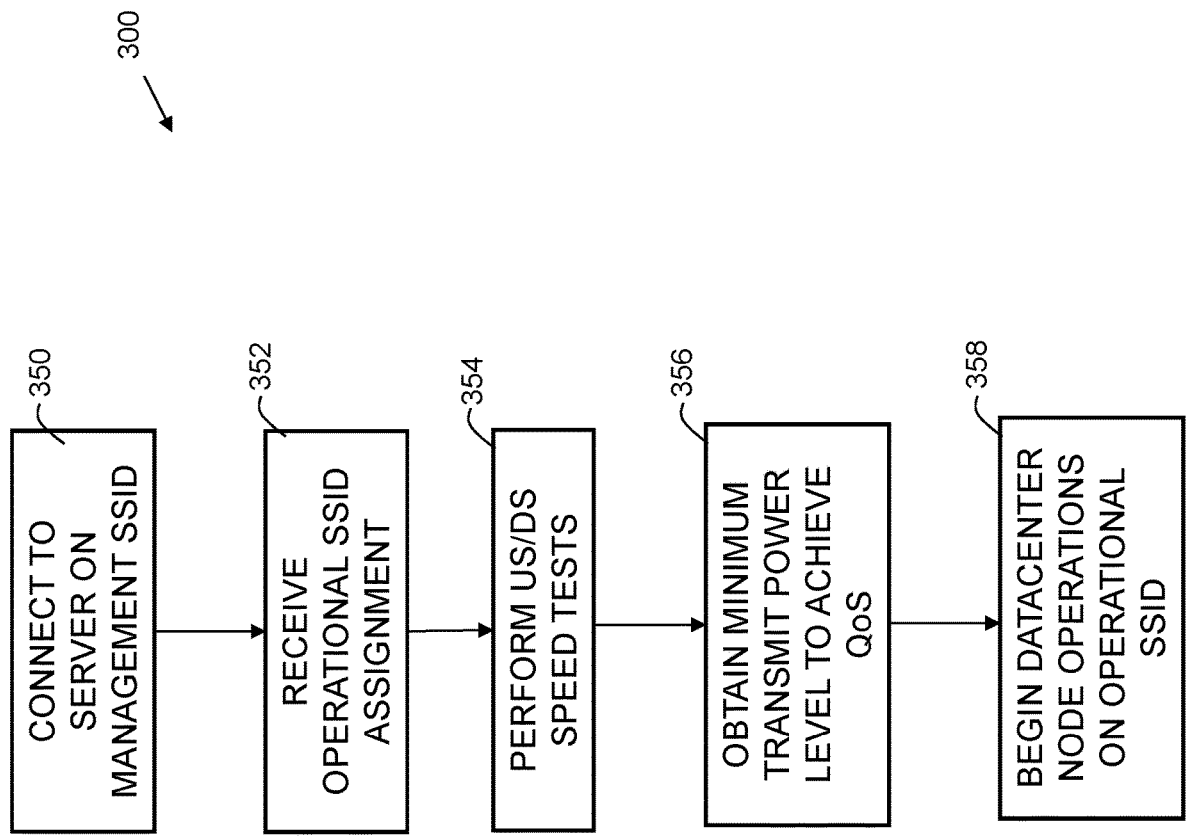
FIG. 3 is a flowchart indicating process steps for wireless datacenter node operations.

FIG. 3 is a flowchart 300 indicating process steps for wireless datacenter node operations. In process step 350, the datacenter node initiates a connection to the wireless network specified by the management SSID. The management SSID may be configured a priori in both the wireless management and discovery system 102 and each datacenter node. The management SSID serves as an agreed-upon SSID for the datacenter nodes to make first contact with the wireless management and discovery system 102 so that an operational SSID and transmission power setting (level) can be established.

In process step 352, an operational SSID assignment is received from the wireless management and discovery system 102. This may be assigned by the wireless management and discovery system 102 via a round robin algorithm.

In process step 354, upstream (US) and/or downstream (DS) speed tests are performed. These speed tests may be performed using a utility such as iperf, iperf3, or other suitable speed test technique. These speed tests may be performed after the datacenter node has connected to the operational SSID. The speed tests may include TCP data traffic, UDP data traffic, and/or other application-specific types of data traffic.

In process step 356, the minimum transmit power level (setting) is obtained, based on selecting the lowest (a minimal) transmit power that achieves the desired quality of service (QoS), data transmission rate, or speed. In process step 358, the datacenter node enters operational mode on the operational SSID, using the transmit power level determined at 356. In this way, the datacenter node is using a minimal transmit power setting for the application of the datacenter. Some applications, such as video streaming, may require a higher transmit power than a low data rate application, such as downloading small amounts of text. Regardless of application, a minimal transit power setting that can achieve the performance for supporting the application is used in both the upstream and downstream directions. This minimizes spillover of the radio frequency energies outside of the physical area where the datacenter is established. By minimizing spillover of the radio frequency energies, other datacenters or computer clusters can be wirelessly configured in a similar manner within a close proximity to each other, thereby improving the datacenter node density within a physical location or premises. Disclosed embodiments are well-suited for a tightly packed datacenter. In some embodiments, a "tightly packed" datacenter can include a wireless datacenter where all datacenter nodes of a given datacenter are within two meters of each other. In some other embodiments, a "tightly packed" datacenter can include a wireless datacenter where all datacenter nodes of a given datacenter are within one meter of each other.

Figure 4:
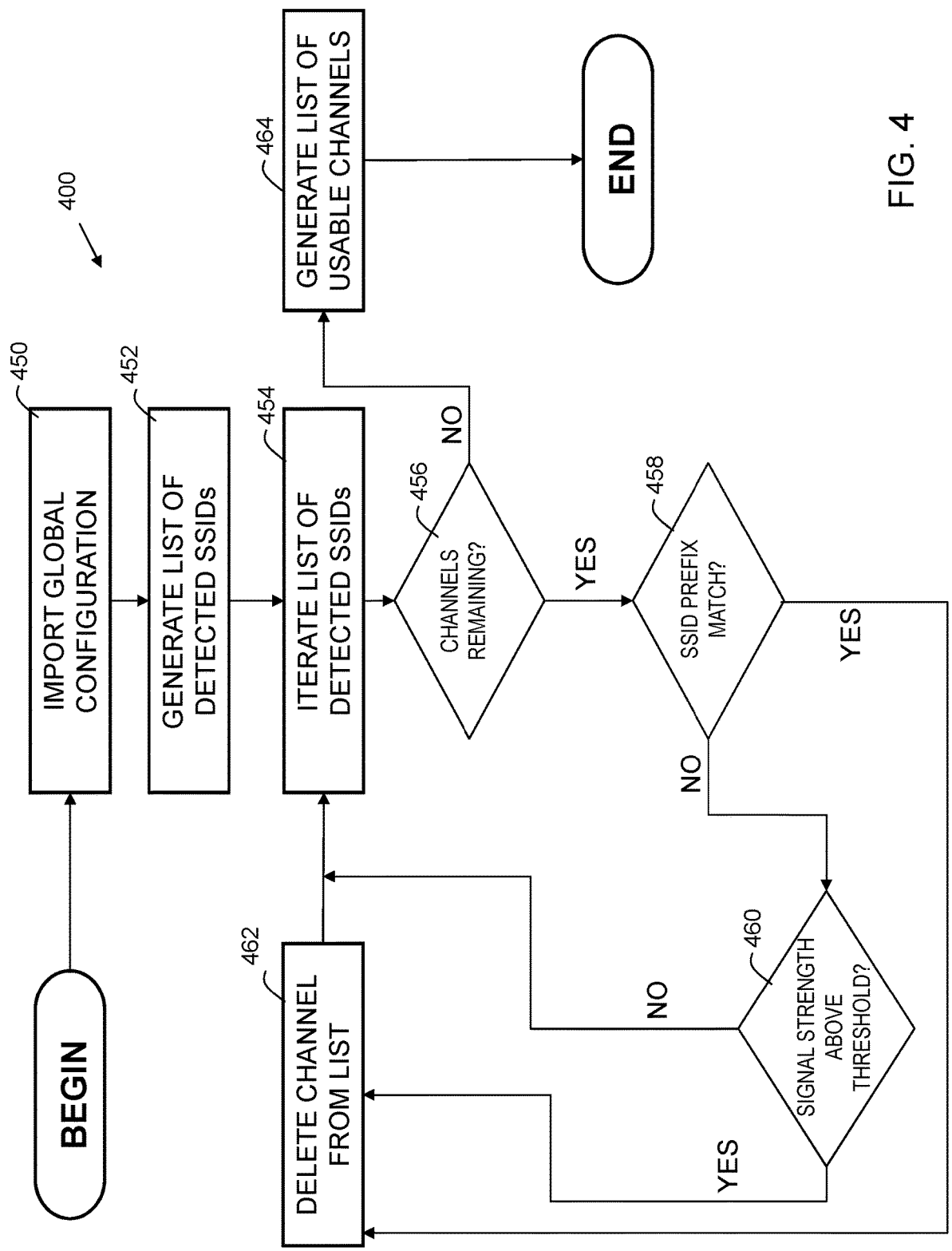
FIG. 4 is a flowchart indicating process steps for determining usable channels.

FIG. 4 is a flowchart 400 indicating process steps for determining usable channels. At process step 450, a global configuration is imported. The configuration can include, but is not limited to, configuration of an SSID prefix. The SSID prefix can be used to identify an SSID as one corresponding to a wireless cross-connect datacenter. The use of the prefix simplifies management by allowing both human administrators and automated processes to easily identify SSIDs that belong to the datacenter. The configuration can further include region information. The region information can include an alphanumeric identifier pertaining to a region (e.g., United States, Canada, etc.) that defines a set of allowable wireless channels. For example, the United States and Canada have different rules regarding allowable wireless channels and/or frequencies. Other countries and/or jurisdictions may have different rules from those of the US and/or Canada. In some cases, the wireless region information is established by an administrator that is setting up the datacenter.

The configuration information can further include a channel width. In embodiments, a choice of 20 MHz, 40 MHz, or 80 MHz may be established. In some embodiments, this choice may be made based on the desired quality of service (QoS), data transmission rate, or speed for the datacenter nodes.

The configuration information can further include an interference strength threshold. In some embodiments, the interference strength threshold may range from −70 dBm to −60 dBm. In some embodiments, the interference strength threshold is established as −65 dBm. The interference strength threshold is a received signal strength level used as a criterion to determine if a detected wireless channel is strong enough to be considered as interfering if that channel were to be used in the datacenter. If the received signal strength level exceeds the threshold, then that wireless channel is deemed ineligible for use in the datacenter. If the received signal strength level is less than or equal to the threshold, then that wireless channel is deemed eligible for use in the datacenter.

At 452, a list of detected SSIDs, channels in use, and corresponding received signal strengths are identified by the wireless management and discovery system 102. At 454, for each of these non-participating networks, the received signal strength is compared with the interference strength threshold that is obtained from the configuration at 450. If the received signal strength is at or below the threshold, then the wireless channel is considered to be usable for the datacenter. If the received signal strength is above the threshold, then the wireless channel is considered to be unusable for the datacenter, since the signal is too strong, and it could potentially interfere with wireless transmission used in support of the datacenter.

At 458, an SSID prefix match check is performed to see if the detected SSID prefix matches a predetermined SSID prefix. Since participating datacenter nodes use an SSID having a predetermined SSID prefix, the wireless management and discovery system 102 can quickly identify SSIDs already in use by the datacenter. Detected SSIDs that do not have the predetermined SSID prefix are deemed to be from wireless networks that are not participating in the wireless datacenter.

If at 458, the detected SSID matches the predetermined SSID prefix, then the channel is removed from the channel list at 462. If instead, the detected SSID does not match the predetermined SSID prefix, then the process proceeds to 460, where a signal strength test is performed using the interference strength threshold obtained at 450. If the received signal strength is above the threshold, then the channel is ineligible, and the process proceeds to 462 where the channel is removed from the list. If, instead, the received signal strength is at or below the threshold, then the channel is eligible and remains in the list. The process continues until, at 456 there are no further channels remaining to be checked for eligibility, and the list of usable (eligible) channels is generated at 464. The list of usable channels at 464 are channels that can be used to support the datacenter.

In some embodiments, the process depicted by flowchart 400 may be periodically executed by the wireless management and discovery system 102. In some embodiments, the process may be performed hourly, daily, weekly, or at another interval. This can be used to check for potential radio interference that may arise after the initial establishment of the datacenter. If such interference is detected, then the wireless management and discovery system 102 may reconfigure the datacenter accordingly. An example may include where, upon initial establishment of the datacenter, channels 1, 2, 3, 4, 5, and 6 are deemed available. During the periodic check, the wireless management and discovery system 102 may instruct each datacenter node to temporarily go offline and switch back to the management SSID. Then, the wireless management and discovery system 102 again performs the process depicted by flowchart 400. If, since the time of the initial establishment of the datacenter, another wireless network is set up nearby that is using channel 5, then the wireless management and discovery system 102 indicates channel 5 as ineligible and attempts to find another eligible channel. If the wireless management and discovery system 102 finds another eligible channel (e.g., channel 7), then it uses the management SSID network to inform the datacenter node that previously used channel 5 to switch to channel 7. The transmit power processes depicted in flowchart 200 and flowchart 300 may be performed to determine the minimum needed transmit power in upstream and downstream directions for channel 7. The remaining datacenter nodes are instructed to revert to their previous SSIDs and corresponding transmit powers for resuming operational mode, since the other nodes did not have to change their wireless communication parameters. Thus, embodiments can include periodically performing a usable channel check, and reconfiguring the wireless datacenter in response to detecting a change in the determined eligible channels.

In some embodiments, the wireless management and discovery system 102 may, prior to performing a periodic usable channel check, put a portion of the datacenter nodes into an offline state, where those offline datacenter nodes connect to the management SSID, and the operational SSID for those datacenter nodes is temporarily disabled. The wireless management and discovery system 102 then performs a usable channel check on the channels corresponding to the operational SSIDs of the datacenter nodes that were taken offline. If the usable channel check indicates that all of the channels corresponding to the operational SSIDs are still usable, then the datacenter nodes that were taken offline are brought back on line, using their previously established operational SSIDs and transmit power settings. If one or more of those channels are now considered ineligible (e.g. some external network that has since been established is interfering with at least one operational SSID), then the datacenter nodes corresponding to the now ineligible channels may be reconfigured to use a new operational SSID and channel. This process can repeat with multiple groups of datacenter nodes until all datacenter nodes have had their channels confirmed to be eligible. In this way, the entire datacenter is not taken offline during the usable channel check process.

Figure 5:
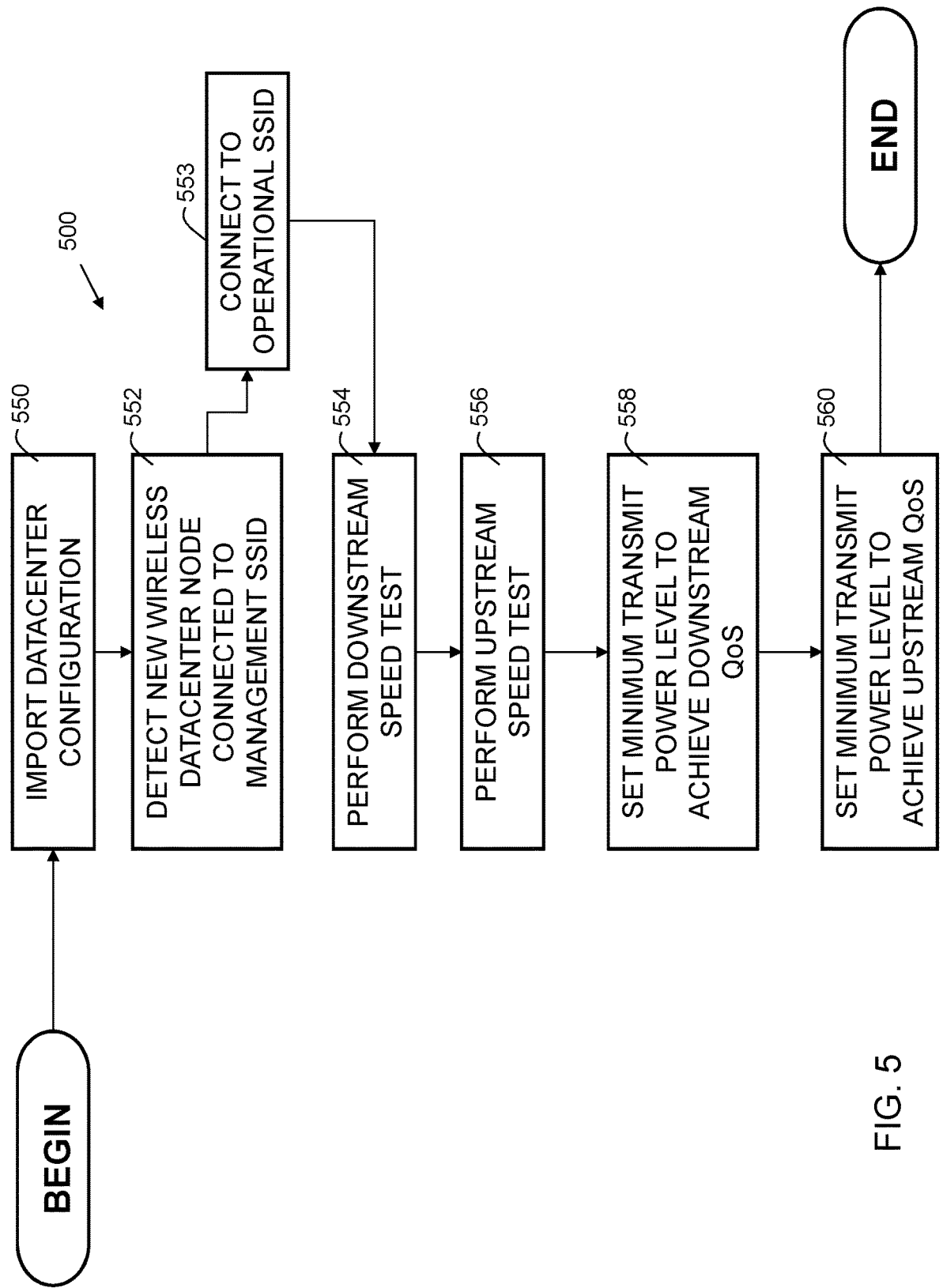
FIG. 5 is a flowchart indicating process steps for determining transmit power.

FIG. 5 is a flowchart 500 indicating process steps for determining transmit power. At 550, a datacenter configuration is imported. The datacenter configuration can include, but is not limited to, a selection of valid transmit powers for testing, a default transmit power, and a desired upstream and downstream quality of service (QoS), data transmission rate, or speed for the datacenter node.

At 552, a new datacenter node is detected by the wireless management and discovery system 102 on the management SSID network. In embodiments, each datacenter node executes a datacenter agent process. The datacenter agent process performs a sequence of initial steps prior to the datacenter node becoming operational. The initial steps can include, but are not limited to, connecting to a predetermined management SSID. Once the wireless management and discovery system 102 connects to the datacenter node via the management SSID, it then assigns it a new SSID on an available channel, and the datacenter node connects to the operational SSID at 553.

At 554, a downstream speed test is performed. The downstream speed test may utilize a utility such as iperf, iperf3, or other suitable utility. The downstream speed test may include configuring the wireless transmit power of the datacenter node and the wireless transmit power of a corresponding access point (e.g., 104 or 108 of FIG. 1) to a default transmit power level. The speed utility (e.g., iperf and/or iperf3) may be used to send packets of a fixed sized from the wireless management and discovery system 102 to the datacenter node. The downstream link performance is then recorded for the tested transmit power. This process repeats using various different transmit power levels until a minimum transmit power setting that achieves the desired downstream link performance is identified.

At 556, an upstream speed test is performed. The upstream speed test may utilize a utility such as iperf, iperf3, or other suitable utility. The upstream speed test may include configuring the wireless transmit power of the datacenter node and the wireless transmit power of a corresponding access point (e.g., 104 or 108 of FIG. 1) to a default transmit power level. The speed utility (e.g., iperf and/or iperf3) may be used to send packets of a fixed sized from the datacenter node to the wireless management and discovery system 102. The upstream link performance is then recorded for the tested transmit power. This process repeats using various different transmit power levels until a minimum transmit power setting that achieves the desired upstream link performance is identified.

At 558, the minimum transmit power level to achieve the downstream quality of service (QoS), data transmission rate, or speed is set at the corresponding access point.

Figure 8:
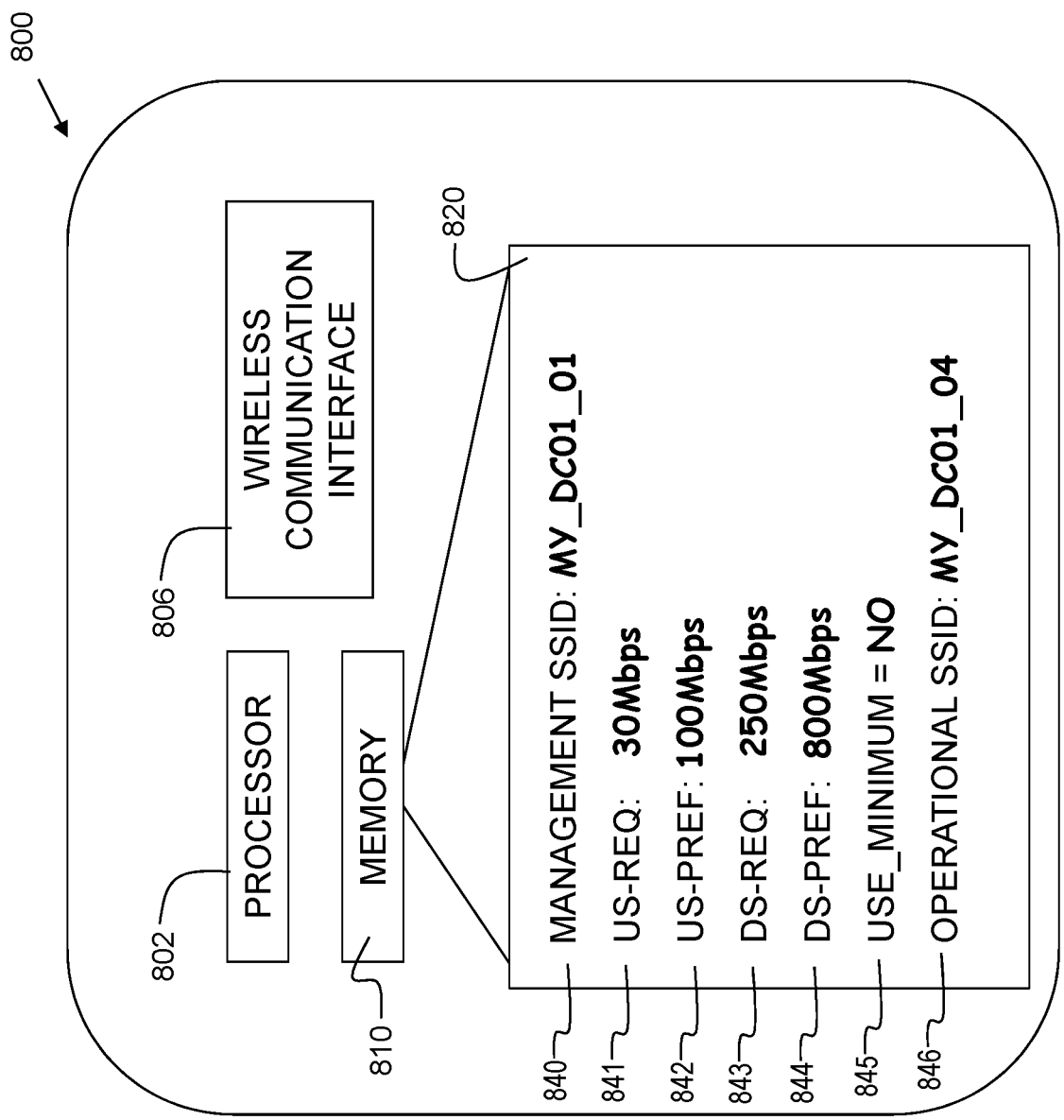
FIG. 8 is a diagram of a wireless datacenter node in accordance with embodiments of the present invention.

At 560, the minimum transmit power level to achieve the upstream quality of service (QoS), data transmission rate, or speed is set at the datacenter node wireless communication interface (e.g., 806 of FIG. 8).

In embodiments, determining a transmit power comprises: obtaining a bandwidth requirement for the wireless datacenter node; performing an upstream speed test on the radio channel for a plurality of wireless datacenter node transmit powers connected to a first wireless access point; and selecting a minimum wireless datacenter node transmit power that corresponds to a successful wireless datacenter node upstream speed test result. Embodiments can further include performing a downstream speed test on the radio channel for a plurality of access point transmit powers for a first wireless access point, and selecting a minimal access point transmit power that corresponds to a successful wireless datacenter node downstream speed test result. Note that while flowchart 500 depicts a particular order, some steps depicted in this flowchart may be performed concurrently, and/or in a different order than shown.

Figure 6:
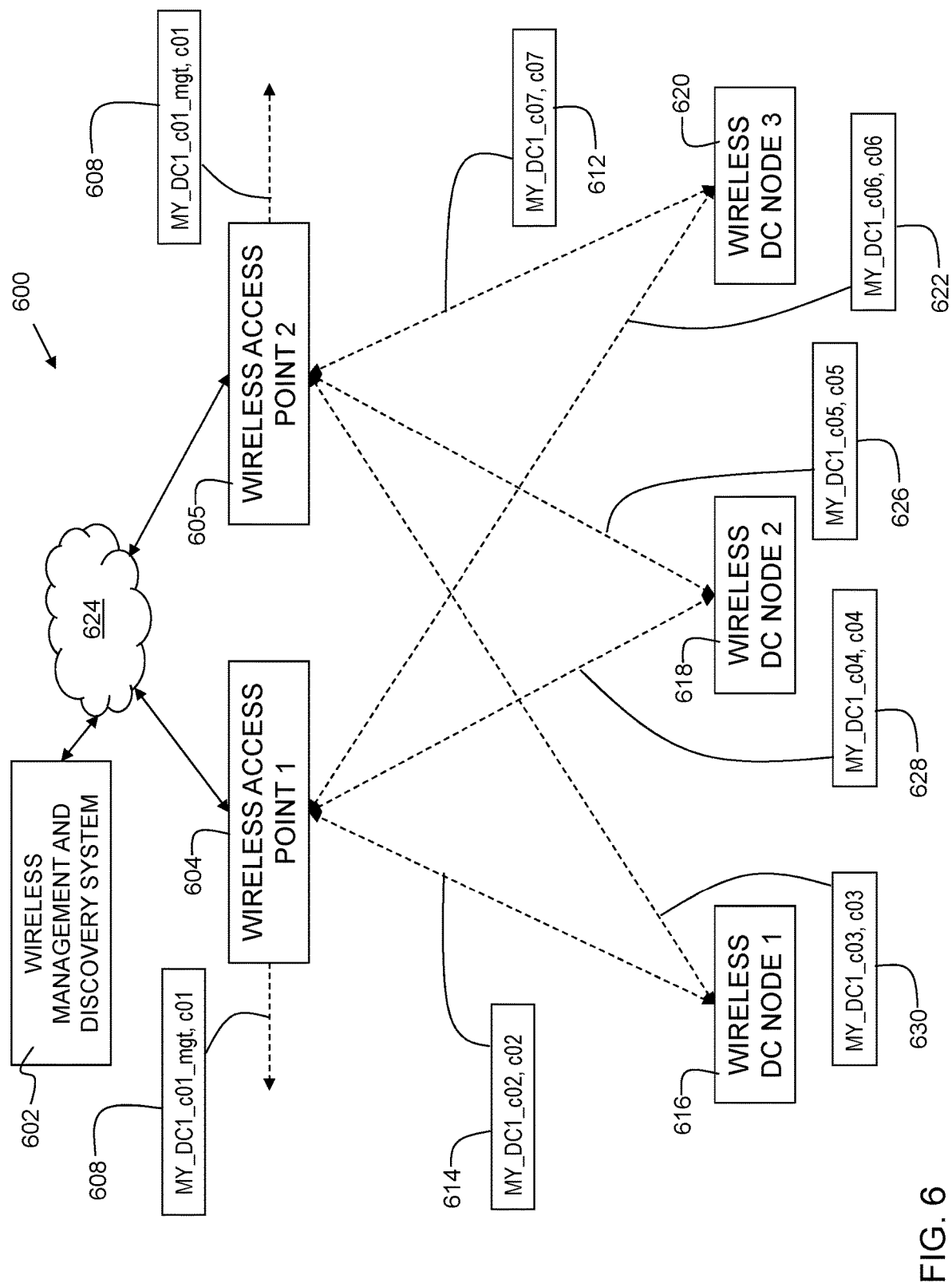
FIG. 6 is a diagram of a wireless datacenter in accordance with embodiments of the present invention.

FIG. 6 is a diagram of a wireless datacenter 600 in accordance with embodiments of the present invention. A wireless management and discovery system 602 (similar to wireless management and discovery system 102 of FIG. 1) is connected to a network 624, which can include the Internet, a wide area network, a local area network, or other suitable network. Two wireless access points are shown: wireless access point 1, indicated by reference 604, and wireless access point 2, indicated by reference 605. In practice, datacenters in accordance with embodiments of the present invention may have more or fewer access points. Two or more access points can be used to provide redundancy. In some embodiments, the wireless management and discovery system 602 may include a wireless communication interface and radios that can communicate with datacenter nodes without the need for a dedicated access point.

At 608, there is indicated the management SSID and channel number, where the SSID is MY_DC1_c01_mgt, and the corresponding channel number is c01, where c01 corresponds to a particular center frequency in a wireless communication standard. For example, in the 802.11ax standard, channel c01 can correspond to a frequency of 2.412 GHz, channel c02 can correspond to a frequency of 2.417 GHz, and so on.

Referring again to FIG. 6, the wireless access points 604 and 605 each connect to the management SSID MY_DC1_c01_mgt. Multiple wireless datacenter (DC) nodes, indicated as wireless DC node 1 (reference number 616), wireless DC node 2 (reference number 618), and wireless DC node 3 (reference number 620), connect to each wireless access point (604 and 605). Dotted lines indicate each wireless connection, and a corresponding text box indicates the SSID and channel in use. Wireless DC node 1 (616) is connected to access point 1 (604) via wireless link 614 which utilizes SSID MY_DC1_c02 and channel c02. Similarly, wireless DC node 1 (616) is also connected to access point 2 (605) via wireless link 630 which utilizes SSID MY_DC1_c03 and channel c03.

Wireless DC node 2 (618) is connected to access point 1 (604) via wireless link 628 which utilizes SSID MY_DC1_c04 and channel c04. Similarly, wireless DC node 2 (618) is also connected to access point 2 (605) via wireless link 626 which utilizes SSID MY_DC1_c05 and channel c05.

Wireless DC node 3 (620) is connected to access point 1 (604) via wireless link 622 which utilizes SSID MY_DC1_c06 and channel c06. Similarly, wireless DC node 3 (620) is also connected to access point 2 (605) via wireless link 612 which utilizes SSID MY_DC1_c07 and channel c07.

The term "wireless link" as used herein indicates a wireless connection using a given SSID. As shown in FIG. 6, the wireless DC nodes 616, 618, and 620 are connected in a fat tree configuration to each wireless access point (604 and 605). This provides redundancy if a wireless access point should fail or go offline for maintenance. As an example, if wireless access point 2 (605) goes offline, each wireless DC node (616, 618, and 620) is still connected to network 624 via wireless access point 1 (604).

As depicted in FIG. 6, each datacenter node has two operational SSIDs assigned to it. Thus, embodiments can include assigning a second operational SSID to the wireless datacenter node, wherein the second operational SSID corresponds to a second wireless access point. In embodiments, there is provided a computer readable storage medium coupled to an electronic computation device that includes program instructions executable by the processor to cause the electronic computation device to: obtain a bandwidth requirement for the wireless datacenter node; perform an upstream speed test on the radio channel for a plurality of wireless datacenter node transmit powers connected to a first wireless access point; and select a minimum wireless datacenter node transmit power that corresponds to a successful wireless datacenter node upstream speed test result. In some embodiments, the computer readable storage medium further includes program instructions executable by the processor to cause the electronic computation device to: perform a downstream speed test on the radio channel for a plurality of access point transmit powers for a first wireless access point; and select a minimal access point transmit power that corresponds to a successful wireless datacenter node downstream speed test result.

In embodiments, the wireless management and discovery system 602 is continuously or periodically monitoring the management SSID 608, listening for any new wireless DC nodes that may be added. To bring up a new wireless DC node, it is powered on in physical proximity to the wireless access points 604 and 605. The new wireless DC node connects on the management SSID and receives an operational SSID and transmit power level setting from the wireless management and discovery system 602. The wireless management and discovery system 602 then sends a message to the new wireless DC node to switch to its assigned operational SSID and enter operational mode.

Figure 7:
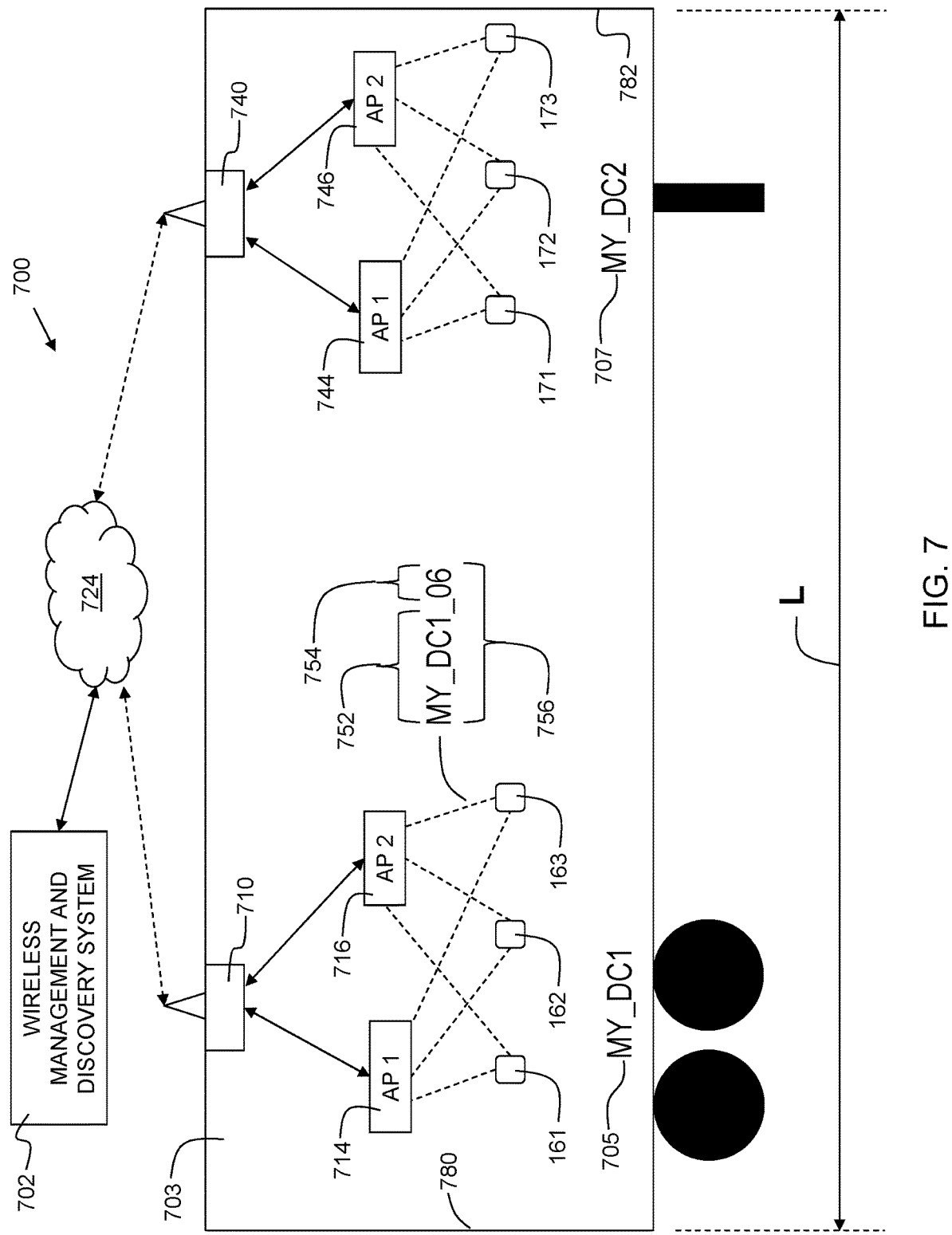
FIG. 7 is a diagram showing multiple wireless datacenters within a premises in accordance with embodiments of the present invention.

FIG. 7 is a diagram 700 showing multiple wireless datacenters within a premises in accordance with embodiments of the present invention. In this example, the premises includes a mobile trailer 703. The mobile trailer 703 has a length L. In embodiments, mobile trailer 703 may be of a standard shipping container size, where length L is 12.2 meters. Trailer 703 contains two datacenters, each set up using embodiments of the present invention. Datacenter 705 is referred to by the SSID prefix of MY_DC1, and datacenter 707 is referred to by the SSID prefix of MY_DC2. Datacenter 705 is installed near rear wall 780 of the trailer 703. Datacenter 707 is installed near front wall 782 of trailer 703, providing as much distance between the datacenters as possible. In the case of a standard-sized mobile trailer, the distance between datacenters can range from 9-11 meters. By choosing appropriate wireless channels and transmission levels, multiple wireless cross-connect datacenters can be established in a confined area such as a building, room, trailer, or other suitable premises.

Datacenter 705 includes access point AP 1, indicated as reference number 714, and access point AP 2, indicated as reference number 716. Datacenter 705 has three datacenter nodes, indicated as 161, 162, and 163. Each datacenter node is connected to both access points of the datacenter for redundancy.

Datacenter 705 may further include wireless modem 710 to enable connection to network 724 via cellular network, LTE, 5G network, or other suitable technique to enable a wireless connection from the datacenter 705 to the network 724 and enable communication between the access points 714 and 716, the datacenter nodes 161, 162, and 163, and the wireless management and discovery system 702 (similar to wireless management and discovery system 102 of FIG. 1). In embodiments, network 724 can include the Internet, a wide area network, a local area network, or other suitable network.

Datacenter 707 includes access point AP 1, indicated as reference number 744, and access point AP 2, indicated as reference number 746. Datacenter 707 has three datacenter nodes, indicated as 171, 172, and 173. Each datacenter node is connected to both access points of the datacenter for redundancy.

Datacenter 707 may further include wireless modem 740 to enable connection to network 724 via cellular network, LTE, 5G network, or other suitable technique to enable a wireless connection from the datacenter 707 to the network 724 and enable communication between the access points 744 and 746, the datacenter nodes 171, 172, and 173, and the wireless management and discovery system 702 (similar to wireless management and discovery system 102 of FIG. 1). In embodiments, datacenter 705 and datacenter 707 are tightly packed datacenters. In embodiments, each datacenter node is a rack-mounted computer, blade computer, or other suitable computer in a small form factor that enables a tightly packed configuration.

In embodiments, the operational SSID includes a prefix corresponding to the datacenter. In embodiments, the operational SSID includes a suffix corresponding to the radio channel. An exemplary SSID prefix is shown at 752 which includes the alphanumeric indicator for the datacenter MY_DC1_. An exemplary suffix is shown at 754 which indicates the alphanumeric indicator for the channel number 06. The prefix 752 and suffix 754 are concatenated to create an SSID of MY_DC1-06 at 756. Thus, in embodiments, the operational SSID is in the form of <name><X>_<channel>, where "name" is the name of the datacenter ("MY_DC" in this example), X is the number of the datacenter ("1" for datacenter 705 and "2" for datacenter 707), and "channel" indicates the channel number ("6" for the example shown with SSID 756). In this way, it becomes easy for humans and computer-based processes to identify which datacenter a given SSID belongs to.

FIG. 8 is a diagram of a wireless datacenter node 800 in accordance with embodiments of the present invention. Wireless datacenter node 800 is an electronic computation device. Wireless datacenter node 800 includes a processor 802 coupled to memory 810. Memory 810 may include dynamic random-access memory (DRAM), static random-access memory (SRAM), magnetic storage, and/or a read only memory such as flash, EEPROM, optical storage, or other suitable memory. In some embodiments, the memory 810 may not be a transitory signal per se. Wireless datacenter node 800 further includes wireless communication interface 806. Wireless communication interface 806 may include one or more radios, interface cards, antennas, and/or other equipment for communicating using a wireless communication standard such as IEEE 802.11 or other suitable wireless communication scheme.

Memory 810 may further include a datacenter configuration 820. The datacenter configuration 820 can include, but is not limited to, a predetermined management SSID 840. In this example, the management SSID is MY_DC01_01. The datacenter configuration can further include an upstream required data rate 841. In this example, the upstream required data rate is 30 Mbps. The datacenter configuration can further include an upstream preferred data rate 842. In this example, the upstream preferred data rate is 100 Mbps. The datacenter configuration can further include a downstream required data rate 843. In this example, the downstream required data rate is 250 Mbps. The datacenter configuration can further include a downstream preferred data rate 844. In this example, the downstream preferred data rate is 800 Mbps.

The datacenter configuration can further include a USE_MINIMUM flag 845. In this example, the USE_MINIMUM flag is set to "NO," meaning that the preferred upstream (842) and downstream (844) data rates are to be used during speed tests to select the minimum transmit powers. If instead the USE_MINIMUM flag is set to "YES," it indicates that the required upstream (841) and downstream (843) rates are to be used during speed tests to select the minimum transmit powers. An example of where this feature is useful is during installation. If a wireless datacenter is being established in a remote area with minimal radio interference from the surrounding environment, then the USE_MINIMUM flag may be set to NO, so that the best possible performance can be achieved. If, instead, a wireless datacenter is being established in an area with additional radio interference from the surrounding environment, then the USE_MINIMUM flag may be set to YES, to enable the minimal required data rates while still co-existing with other in-use wireless channels in the area.

The datacenter configuration can further include an operational SSID 846. The operational SSID 846 is assigned by the wireless management and discovery system (e.g. 102 of FIG. 1). In this example, the operational SSID is indicated as MY_DC01_04, indicating that the SSID belongs to datacenter 1 (705 of FIG. 7), and uses channel 4 (e.g., 2.427 GHz). Other data fields may also be included instead of, or in addition to, those depicted in FIG. 8.

FIG. 9 is a flowchart 900 indicating process steps for transmit power optimization in accordance with embodiments of the present invention. At 950, a minimum transmit power level for a required speed (data transmission rate) is determined. This is performed by using speed tests as depicted in flowchart 500. At 952, a minimum transmit power level for a preferred speed (data transmission rate) is determined. This is performed by using speed tests as depicted in flowchart 500.

At 954, the difference in transmit power level between the required and preferred data transmission rates (speed) is determined. If, at 956, the difference exceeds a predetermined threshold, then the minimum transmit power level for the required speed is set at 958. If instead, the difference does not exceed the predetermined threshold, then the minimum transmit power level for the preferred speed is set at 960. In this way, if the difference between the transmit power level for the preferred speed is not much more than that for the required speed, then the preferred speed transmit power level is used. If instead, there is considerably more transmit power required to achieve the preferred speed, then the required speed is used to minimize propagation of the wireless signals associated with the datacenter. In embodiments, the predetermined threshold may be customizable as part of the datacenter configuration.

Embodiments can include, determining a minimum transmit power setting for a second data transmission rate for the wireless datacenter node on a radio channel selected from the list of available radio channels; determining a power difference between the minimum transmit power setting for the second data transmission rate and the minimum transmit power setting for the predetermined data transmission rate; and setting a radio transmit power to the minimum transmit power setting for the second data transmission rate in response to the power difference being less than a predetermined threshold. In embodiments, the predetermined data transmission rate may correspond to a minimum required data transmission rate. This is the minimum data transmission rate in order for the datacenter node to function properly. In embodiments, the second data transmission rate may correspond to a preferred data transmission rate. The preferred data transmission rate may be greater than the minimum data transmission rate.

Embodiments can further include setting the minimum transmit power for the predetermined data transmission rate in response to the power difference being greater than or equal to the predetermined threshold. In some embodiments, the predetermined threshold is in a range from 3 dBm to 10 dBm.

As can now be appreciated, disclosed embodiments provide techniques for setting up a wireless datacenter. By automating the identification of eligible wireless radio channels to use, and selecting an optimal transmission power, disclosed embodiments improve the technical field of wireless datacenter setup and management.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for establishing a wirelessly connected datacenter, comprising:
   determining a list of available radio channels;
   in response to a wireless datacenter node connecting to a management server via a management service set identifier (SSID):
      determining a minimum transmit power setting for a minimum data transmission rate for the wireless datacenter node on a radio channel selected from the list of available radio channels;
      assigning the wireless datacenter node an operational SSID corresponding to the radio channel; and
      sending the minimum transmit power setting to the wireless datacenter node; and
   wherein the determining the minimum transmit power setting comprises:

obtaining a bandwidth requirement for the wireless datacenter node;
performing an upstream speed test on the radio channel for a plurality of wireless datacenter node transmit powers connected to a first wireless access point; and
selecting a minimum wireless datacenter node transmit power that corresponds to a successful wireless datacenter node upstream speed test result.

2. The method of claim 1, further comprising:
performing a downstream speed test on the radio channel for a plurality of access point transmit powers for a first wireless access point; and
selecting a minimal access point transmit power that corresponds to a successful wireless datacenter node downstream speed test result.

3. The method of claim 1, wherein assigning the wireless datacenter node an operational SSID is performed with a round robin algorithm.

4. The method of claim 1, further comprising assigning a second operational SSID to the wireless datacenter node, wherein the second operational SSID corresponds to a second wireless access point.

5. The method of claim 1, wherein the operational SSID includes a prefix corresponding to the datacenter.

6. The method of claim 5, wherein the operational SSID includes a suffix corresponding to the radio channel.

7. The method of claim 1, further comprising:
determining a minimum transmit power setting for a second data transmission rate for the wireless datacenter node on a radio channel selected from the list of available radio channels;
determining a power difference between the minimum transmit power setting for the second data transmission rate and the minimum transmit power setting for the minimum data transmission rate; and
setting a radio transmit power to the minimum transmit power setting for the second data transmission rate in response to the power difference being less than a predetermined threshold.

8. The method of claim 7, further comprising setting the minimum transmit power for the minimum data transmission rate in response to the power difference being greater than or equal to the predetermined threshold.

9. The method of claim 8, wherein the predetermined threshold is in a range from 3 dBm to 10 dBm.

10. An electronic computation device comprising:
a processor;
a memory coupled to the processor, the memory containing instructions, that when executed by the processor, cause the device to:
determine a list of available radio channels;
in response to a wireless datacenter node connecting to a management server via a management service set identifier (SSID):
determine a minimum transmit power setting for a minimum data transmission rate for the wireless datacenter node on a radio channel selected from the list of available radio channels;
assign the wireless datacenter node an operational SSID corresponding to the radio channel; and
send the minimum transmit power setting to the wireless datacenter node; and
wherein the determining the minimum transmit power setting comprises:
obtain a bandwidth requirement for the wireless datacenter node;
perform an upstream speed test on the radio channel for a plurality of wireless datacenter node transmit powers connected to a first wireless access point; and
select a minimum wireless datacenter node transmit power that corresponds to a successful wireless datacenter node upstream speed test result.

11. The electronic computation device of claim 10, wherein the memory further comprises instructions, that when executed by the processor, cause the device to:
perform a downstream speed test on the radio channel for a plurality of access point transmit powers for a first wireless access point; and
select a minimal access point transmit power that corresponds to a successful wireless datacenter node downstream speed test result.

12. The electronic computation device of claim 10, wherein the memory further comprises instructions, that when executed by the processor, cause the device to assign the wireless datacenter node an operational SSID using a round robin algorithm.

13. The electronic computation device of claim 10, wherein the memory further comprises instructions, that when executed by the processor, cause the device to assign a second operational SSID to the wireless datacenter node, wherein the second operational SSID corresponds to a second wireless access point.

14. The electronic computation device of claim 10, wherein the memory further comprises instructions, that when executed by the processor, cause the device to include a prefix in the operational SSID name that corresponds to the datacenter.

15. The electronic computation device of claim 14, wherein the memory further comprises instructions, that when executed by the processor, cause the device to include a suffix in the operational SSID name that corresponds to the radio channel.

16. A computer program product for an electronic computation device comprising a computer readable hardware storage device having program instructions embodied therewith, the program instructions executable by a processor to cause the electronic computation device to:
determine a list of available radio channels;
in response to a wireless datacenter node connecting to a management server via a management service set identifier (SSID):
determine a minimum transmit power setting for a minimum data transmission rate for the wireless datacenter node on a radio channel selected from the list of available radio channels;
assign the wireless datacenter node an operational SSID corresponding to the radio channel; and
send the minimum transmit power setting to the wireless datacenter node; and
wherein the determining the minimum transmit power setting comprises:
obtain a bandwidth requirement for the wireless datacenter node;
perform an upstream speed test on the radio channel for a plurality of wireless datacenter node transmit powers connected to a first wireless access point; and
select a minimum wireless datacenter node transmit power that corresponds to a successful wireless datacenter node upstream speed test result.

17. The computer program product of claim 16, wherein the computer readable hardware storage device includes program instructions executable by the processor to cause the electronic computation device to:

perform a downstream speed test on the radio channel for a plurality of access point transmit powers for a first wireless access point; and select a minimal access point transmit power that corresponds to a successful wireless datacenter node downstream speed test result.

* * * * *